(12) United States Patent
Chung

(10) Patent No.: US 11,646,062 B2
(45) Date of Patent: May 9, 2023

(54) METHOD FOR CONTROLLING EDIT USER INTERFACE OF MOVING PICTURE FOR CLIP ALIGNMENT CONTROL AND APPARATUS FOR THE SAME

(71) Applicant: KineMaster Corporation, Seoul (KR)

(72) Inventor: Jae Won Chung, Seoul (KR)

(73) Assignee: KineMaster Corporation, Seoul (KR)

( * ) Notice: Subject to any disclaimer, the term of this patent is extended or adjusted under 35 U.S.C. 154(b) by 0 days.

(21) Appl. No.: 17/086,420

(22) Filed: Nov. 1, 2020

(65) Prior Publication Data
US 2021/0134328 A1 May 6, 2021

(30) Foreign Application Priority Data
Nov. 1, 2019 (KR) .................. 10-2019-0138782

(51) Int. Cl.
| | | |
|---|---|---|
| *G11B 27/10* | (2006.01) | |
| *G06F 3/04847* | (2022.01) | |
| *G06F 3/04855* | (2022.01) | |
| *G11B 27/034* | (2006.01) | |
| *G11B 27/34* | (2006.01) | |

(52) U.S. Cl.
CPC ........ *G11B 27/105* (2013.01); *G06F 3/04847* (2013.01); *G06F 3/04855* (2013.01); *G11B 27/034* (2013.01); *G11B 27/34* (2013.01)

(58) Field of Classification Search
CPC ..... G11B 27/105; G11B 27/034; G11B 27/34; G11B 27/031; G06F 3/04847; G06F 3/04855; G06F 3/0481; G06F 3/0488; G06F 3/0482; G06F 3/04845; H04N 21/431; H04N 21/44016; H04N 21/47205; H04N 21/854

See application file for complete search history.

(56) References Cited

U.S. PATENT DOCUMENTS

| | | | |
|---|---|---|---|
| 7,512,886 | B1 | 3/2009 | Herberger |
| 8,006,192 | B1 | 8/2011 | Reid |
| 2013/0121668 | A1 | 5/2013 | Meaney |
| 2013/0297051 | A1 | 11/2013 | Stegner |
| 2014/0355960 | A1 | 12/2014 | Paulus |

(Continued)

FOREIGN PATENT DOCUMENTS

| | | |
|---|---|---|
| CN | 103716712 A | 4/2014 |
| CN | 103916535 A | 7/2014 |

(Continued)

*Primary Examiner* — Girumsew Wendmagegn
(74) *Attorney, Agent, or Firm* — McDonnell Boehnen Hulbert & Berghoff LLP

(57) ABSTRACT

Disclosed herein is a video editing UI control apparatus. A video editing UI control apparatus according to the present disclosure may include: an editing UI display unit for visually displaying an editing UI comprising a play head and a clip movement control UI in a display unit; a user input confirmation unit for confirming user input information based on a user input that is provided through a touch input in the display device; and an editing UI processing unit for confirming an input of the clip movement control UI based on the user input information provided by the user input confirmation unit and for moving at least one clip to a reference time in which the play head is located.

10 Claims, 20 Drawing Sheets

(56) References Cited

U.S. PATENT DOCUMENTS

| | | | | |
|---|---|---|---|---|
| 2017/0024110 | A1* | 1/2017 | Xu | G06F 3/165 |
| 2017/0032821 | A1* | 2/2017 | Long | H04N 21/41407 |
| 2017/0034583 | A1 | 2/2017 | Long | |

FOREIGN PATENT DOCUMENTS

| | | | |
|---|---|---|---|
| CN | 107256117 | A | 10/2017 |
| GB | 2356733 | B | 12/2003 |
| JP | 2011-244361 | A | 12/2011 |
| JP | 6214619 | B2 | 10/2017 |

\* cited by examiner

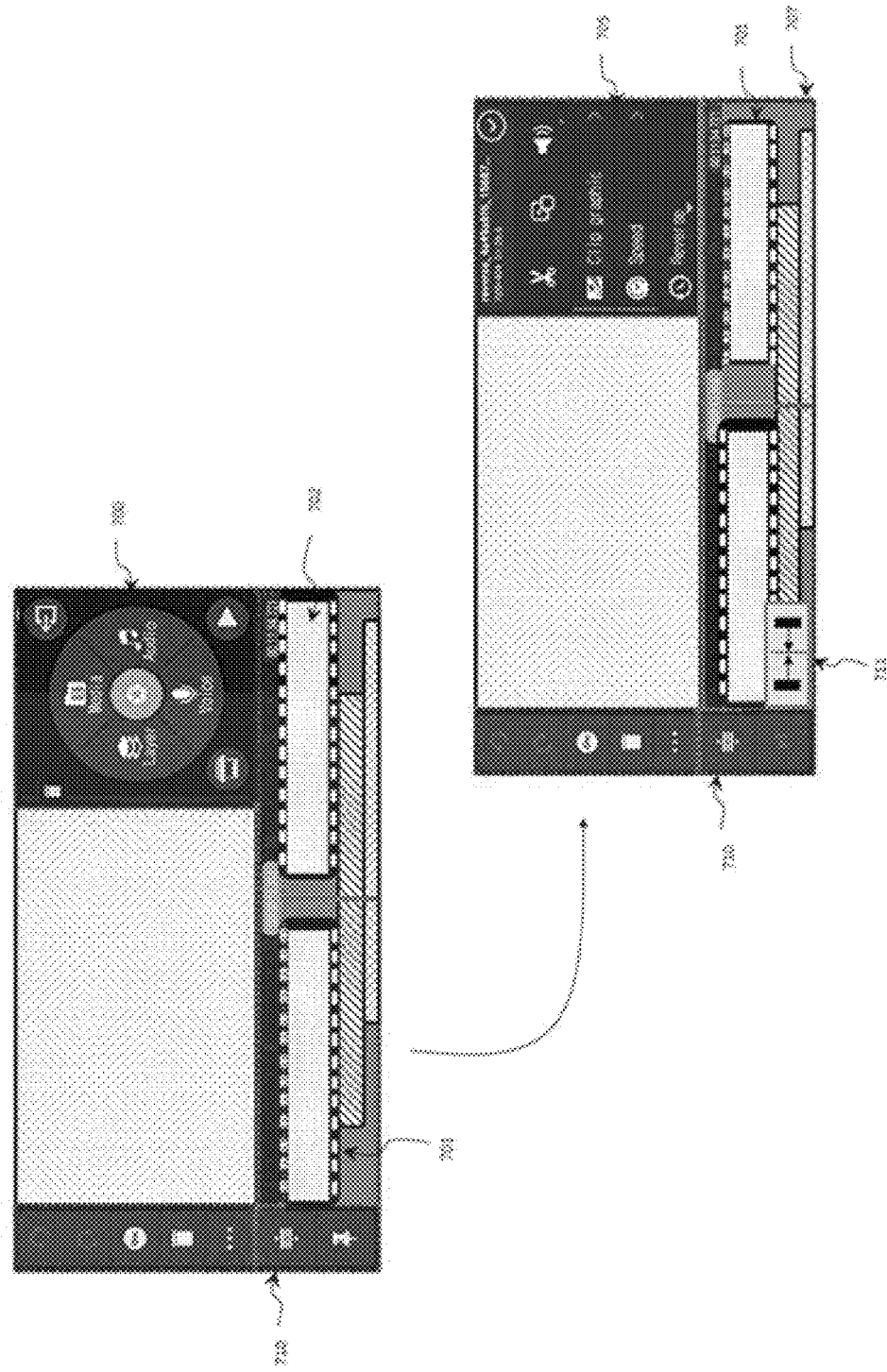

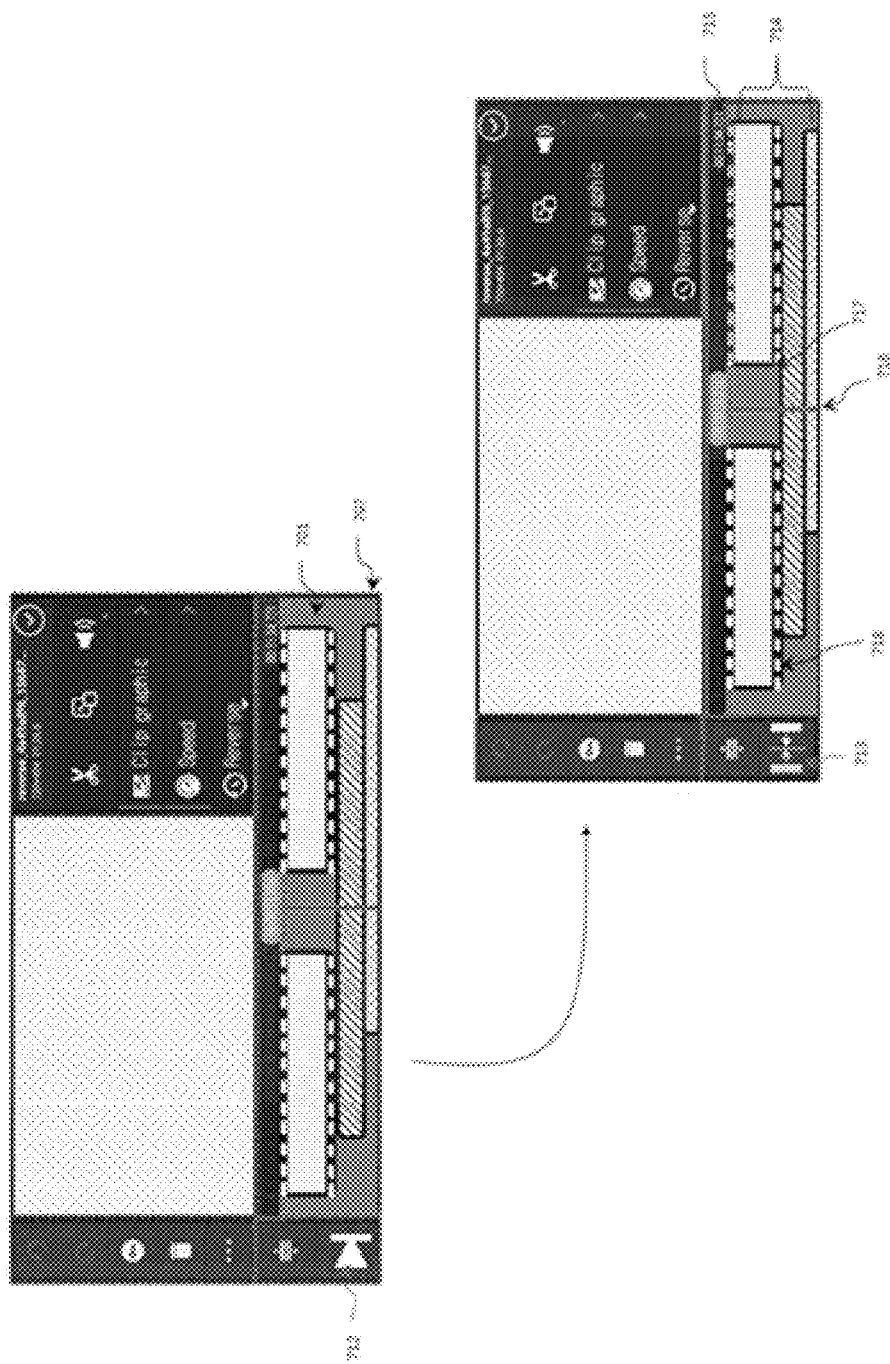

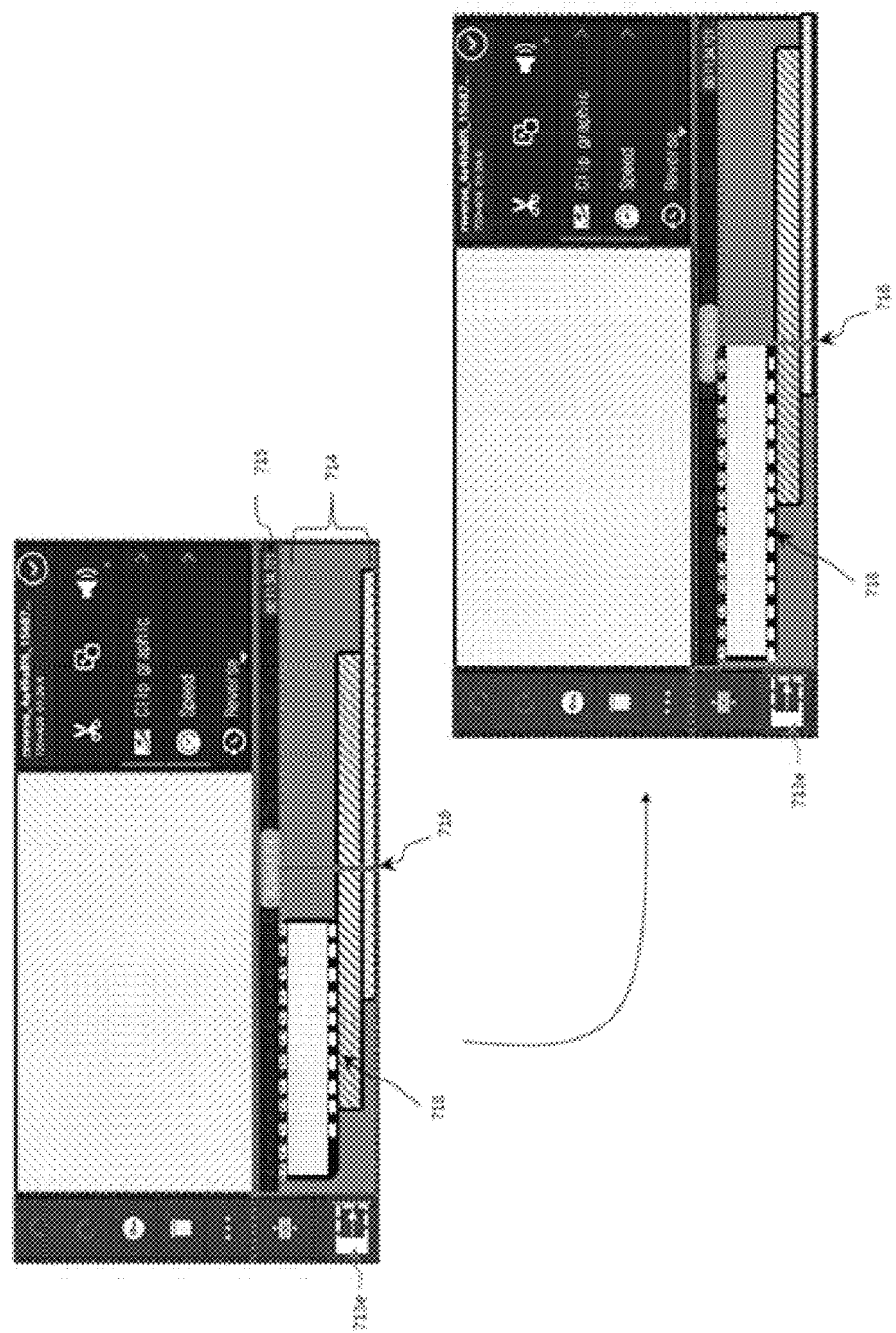

METHOD FOR CONTROLLING EDIT USER INTERFACE OF MOVING PICTURE FOR CLIP ALIGNMENT CONTROL AND APPARATUS FOR THE SAME

CROSS REFERENCE TO RELATED APPLICATION

The present application claims priority to Korean Patent Application No. 10-2019-0138782, filed Nov. 1, 2019, the entire contents of which are incorporated herein for all purposes by this reference.

BACKGROUND OF THE INVENTION

Field of the Invention

The present disclosure relates to a method and apparatus for controlling a user interface, and more particularly, to a method and apparatus for providing and controlling a user interface used for video editing.

Description of the Related Art

Recently, portable terminals such as smart phones and tablets are widely used, and the performance advances of such portable terminals and the development of wireless communication technology allow users to shoot, edit, and share videos using portable terminals.

However, due to limitations in LCD size and hardware performance, users cannot edit videos by using a portable terminal as smoothly as in the general PC environment. In order to alleviate such inconvenience, user demand for a video editing method that can be used in a portable terminal is increasing.

In addition, as the needs of users of portable terminals are on the rise, the performance of camera, display and other hardware in portable terminals are being advanced, and many functions or services that used to be available only in the PC environment have been replaced by portable terminals. Particularly, as each portable terminal has a camera as a basic component, the needs of users for editing images or videos shot by cameras are increasing.

SUMMARY OF THE INVENTION

Although video editing technology has been diffused to use only limited functions due to the resource characteristics of portable terminals, the users' demand for video editing increases up to a level comparable to the PC environment.

Meanwhile, when editing a video using a mouse, a keyboard or other input devices in the PC environment, a user's action to operate an input device is required. However, as such an input device does not operate as smoothly as desired, the user's convenience is degraded, which is a problem.

A portable terminal is generally equipped with a display supporting touch input. When processing a user's input through a display supporting touch input, the user's input may be processed more intuitively and the user's convenience may be significantly improved.

In view of the foregoing description, one technical object of the present disclosure is to provide an editing UI control method and apparatus that are capable of intuitively processing various functions for video editing.

Another technical object of the present disclosure is to provide an editing UI control method and apparatus that are capable of easily controlling the movement of at least one clip or layer included in a video project by using a play head.

Another technical object of the present disclosure is to provide an editing UI control method and apparatus that are capable of processing the movement of at least one clip or layer only by selecting a clip movement control UI.

The technical objects of the present disclosure are not limited to the above-mentioned technical objects, and other technical objects that are not mentioned will be clearly understood by those skilled in the art through the following descriptions.

According to one aspect of the present disclosure, a video editing UI control apparatus may be provided. The apparatus may include: an editing UI display unit for visually displaying an editing UI including a play head and a clip movement control UI in a display unit; a user input confirmation unit for confirming user input information based on a user input that is provided through a touch input in the display device; and an editing UI processing unit for confirming an input of the clip movement control UI based on the user input information provided by the user input confirmation unit and for moving at least e clip to a reference time in which the play head is located.

According to another aspect of the present disclosure, a video editing UI control method may be provided. The method may include: visually displaying an editing UI including a play head and a clip movement control UI in a display unit; confirming user input information based on a user input that is provided through a touch input in the display device; and confirming the user input information and an input of the clip movement control UI based on the user input information and moving at least one clip to a reference time in which the play head is located.

The features briefly summarized above with respect to the present disclosure are merely exemplary aspects of the detailed description below of the present disclosure, and do not limit the scope of the present disclosure.

According to the present disclosure, an editing UI control method and apparatus may be provided which are capable of easily controlling the movement of at least one clip or layer included in a video project by using a play head.

Also, according to the present disclosure, an editing UI control method and apparatus may be provided which are capable of processing the movement of at least one clip or layer only by selecting a clip movement control UI, without having to select and move at least one clip or layer to a play head.

Also, according to the present disclosure, an editing UI control method and apparatus may be provided which are incapable of significantly improving a user's convenience in moving at least one selected clip or layer in an environment of portable terminal, since the at least one clip or layer can be easily moved only by selecting an area provided with a clip movement control UI after moving a play head to an area to which the at least clip or layer is to be moved, without the necessity of performing drag input after selecting the at least one clip or layer.

Effects obtained in the present disclosure are not limited to the above-mentioned effects, and other effects not mentioned above may be clearly understood by those skilled in the art from the following description.

BRIEF DESCRIPTION OF THE DRAWINGS

FIG. 7A to FIG. 7H are views exemplifying a clip movement control UI provided in a video editing UI control apparatus according to various embodiments of the present disclosure.

DETAILED DESCRIPTION OF THE INVENTION

Figure 1:
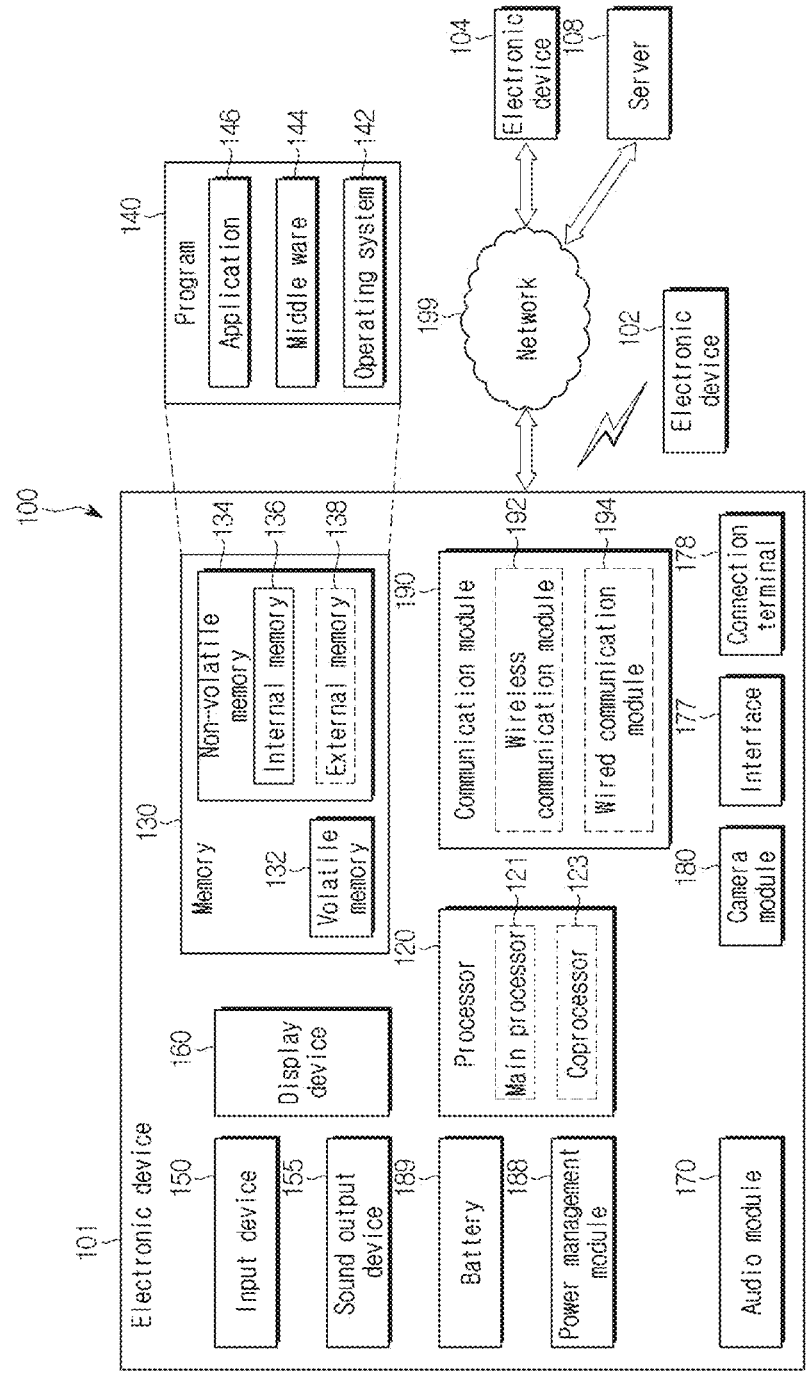
FIG. 1 a view exemplifying an electronic device to which various embodiments of the present disclosure are applied.

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Various embodiments of the present disclosure may be implemented in a smart phone, a tablet and other electronic devices equipped with display units. A video editing apparatus according to an embodiment of the present disclosure may be implemented by an electronic device equipped with a video editing application. Alternatively, the video editing apparatus may be implemented by an electronic device equipped with an image processing unit and a controlling unit capable of processing a video and subtitles data.

Preferably, an electronic device, to which various embodiments of the present disclosure are applied, means a portable electronic device.

FIG. 1 a view exemplifying an electronic device to which various embodiments of the present disclosure are applied. That is, FIG. 1 is a block diagram showing an electronic device 101 in a network environment 100.

Referring to FIG. 1, the electronic device 101 in the network environment 100 may communicate with an electronic device 102 through a first network 198 (e.g., short-range wireless communication) or communicate with an electronic device 104 or a server 108 through a second network 199 (e.g., long-range wireless communication). According to an embodiment, the electronic device 101 may communicate with the electronic device 104 through the server 108. According to an embodiment, the electronic device 101 may include a processor 120, a memory 130, an input device 150, a sound output device 155, a display device 160, an audio module 170, an interface 177, a camera module 180, a power management module 188, a battery 189, and a communication module 190. In a certain embodiment, the electronic device 101 may omit at least one (e.g., the display device 160 or the camera module 180) of the components or include another component.

The processor 120 may control at least one of the other components (e.g., hardware or software components) of the electronic device 101 connected to the processor 120, for example, by deriving software e.g, a program 140) and perform processing and operation for various data. The processor 120 may process a command or data received from another component (e.g., the communication module 190) by loading the command or data in a volatile memory 132 and store result data in non-volatile memory 134. According to an embodiment, the processor 120 may be operated independently of a main processor 121 (e.g., a CPU or an application processor) and additionally or alternatively use less power than the main processor 121 or include a coprocessor 123 specialized in a designated function (e.g., a graphics processing unit, an image signaling processor, a sensor hub processor, or a communication processor). Herein, the coprocessor 123 may be operated independently of or by being embedded in the main processor 121.

In this case, the coprocessor 123 may control at least some functions or states associated with at least one (e.g., the display device 160 or the communication module 190) of the components of the electronic device 101, instead of the main processor 121 while the main processor 121 is in an inactive (e.g., sleep) state or along with the main processor 121 while the main processor 121 is in an active (e.g., application operating) state. According to an embodiment, the coprocessor 123 (e.g., an image signaling processor or a communication processor) may be implemented as a component of another functionally associated component (e.g., the camera module 180 or the communication module 190). The memory 130 may store various data used by at least one component (e.g., the processor 120), that is, input data or output data for software (e.g., the program 140) and a command associated therewith. The memory 130 may include the volatile memory 132 or the non-volatile memory 134.

As software stored in the memory 130, the program 140 may include, for example, an operating system 142, middleware 144 or an application 146.

The input device 150 is a device for receiving a command or data to be used for a component (e.g., the processor 120) of the electronic device 101 from the outside (e.g., a user) of the electronic device 101. The input device 150 may include a microphone, a mouse or a keyboard.

The sound output device 155 is a device for outputting an acoustic signal to the outside of the electronic device 101. The sound output device 155 may include a speaker used for a general purpose like multimedia play or playback and a receiver used exclusively for receiving telephone calls. According to an embodiment, a receiver may be integrated with or separate from a speaker.

The display device 160 is a device for visually provide a user with information of the electronic device 101. The display device 160 may include, for example, a display, a hologram device, or a projector and a control circuit for controlling the device. According to an embodiment, the display device 160 may include touch circuitry or a pressure sensor capable of measuring a pressure intensity for a touch. Correspondingly, based on touch circuitry or a pressure sensor, the display device 160 may detect a coordinate of a touched input region, the number of touched input regions and a touched input gesture, and provide a detection result to the main processor 121 or the coprocessor 123.

The audio module 170 may bidirectionally convert a sound and an electrical signal. According to an embodiment, the audio module 170 may obtain a sound through the input device 150 or output a sound through the sound output device 155 or an external electronic device (e.g., the electronic device 102 (e.g., a speaker or a headphone)) wired or wirelessly connected to the electronic device 101.

The interface 177 may support a designated protocol capable of wired or wireless connection to an external electronic device (e.g., the electronic device 102). According to an embodiment, the interface 177 may include a high definition multimedia interface (HDMI), a universal serial bus (USB) interface, a SD card or an audio interface.

A connection terminal 178 may include a connected capable of physically connecting the electronic device 101 and an external electronic device (e.g., the electronic device 102), for example, a HDMI connector, a USB connector, a SD card connector or an audio connector (e.g., a headphone connector).

The camera module 180 may shoot a still image and a moving image. According to an embodiment, the camera module 180 may include one or more lenses, an image sensor, an image signal processor or a flash.

The power management module 188 is a module for managing power supplied to the electronic device 101 and may be, for example, a part of a power management integrated circuit (PMIC).

The battery 189 is a device for supplying power to at least one component of the electronic device 101 and may include, for example, a non-rechargeable primary cell, a rechargeable secondary cell or a fuel cell.

The communication module 190 may establish a wired or wireless communication channel between the electronic device 101 and an external electronic device (e.g., the electronic device 102, the electronic device 104, or the server 108) and support the execution of communication through the established communication channel. The communication module 190 may include one or more communication processors that are operated independently of the processor 120 and support wired or wireless communication. According to an embodiment, the communication module 190 may include a wireless communication module 192 (e.g., a cellular communication module, a short-range wireless communication module, or a global navigation satellite system (GNSS)) or a wired communication module 194 (e.g., a local area network (LAN) communication module, or a power line communication module) and communicate with an external electronic device by using a corresponding communication module through a first network 198 (e.g., a short-range communication network like Bluetooth, BLE (Bluetooth Low Energy), WiFi direct or IrDA (Infrared Data Association)) or a second network 199 (e.g., a long-range communication network like a cellular network, the Internet or a computer network (e.g., LAN or WAN)). The various types of communication modules 190 described above may be implemented as a single chip or separate chips respectively.

Among the above components, some components may exchange a signal (e.g., a command or data) by being connected with each other through a communication type (e.g., bus, general purpose input/output (GPIO), serial peripheral interface (SPI)) among peripheral devices or a mobile industry processor interface (MIPI).

According to an embodiment, a command or data may be transmitted or received between the electronic device 101 and the external electronic device 104 through the server 108 connected to the second network 199. Each electronic device 102 and 104 may be a device of a same type as or a different type from the electronic device 101. According to an embodiment, all or some of the operations performed in the electronic device 101 may be performed in another external electronic device or in a plurality of external electronic devices. According to an embodiment, when the electronic device 101 has to execute a function or service either automatically or at a request, the electronic device 101 may request at least some functions associated with the function or service to an external electronic device either additionally or instead of executing the function or service by itself. When receiving the request, the external electronic device may execute the requested function or service and deliver a corresponding result to the electronic device 101. The electronic device 101 may provide the requested function or service by processing the received result either as it is or additionally. For this, for example, cloud computing technology, distributed computing technology, or client-server computing technology may be used.

Figure 2:
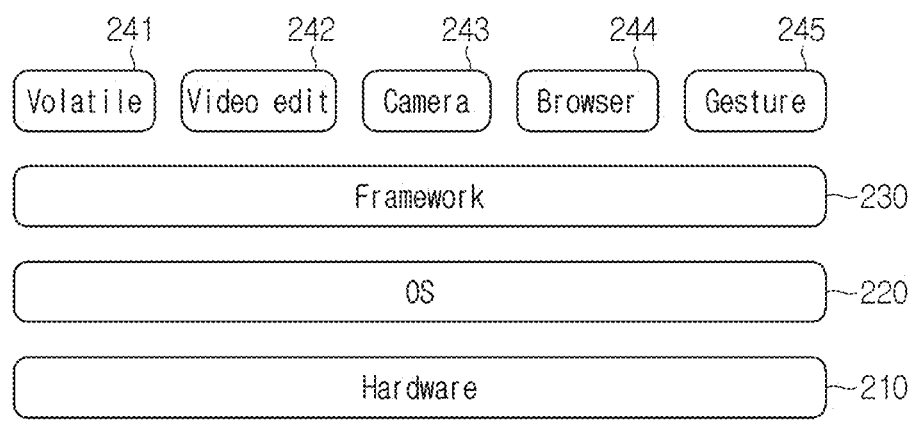
FIG. 2 is a view for describing a system hierarchy of an electronic device to which various embodiments of the present disclosure are applied.

FIG. 2 is a view for describing a system hierarchy of an electronic device to which various embodiments of the present disclosure are applied.

Referring to FIG. 2, an electronic device 200 may be configured by including a hardware layer 201 corresponding to the electronic device 100 of FIG. 1, an operating system (OS) layer 200 as an upper layer of the hardware layer 210 for managing the hardware layer 210, and a framework layer 230 and an application layer 240 as upper layers of the OS layer 220.

The OS layer 220 controls the overall operation of the hardware layer 210 and manages the hardware layer 210. That is, the OS layer 220 is a layer executing basic functions including hardware management, memory and security. The OS layer 220 may include a display driver for driving a display device, a camera driver for driving a camera module, an audio driver for driving an audio module and any similar driver for operating or driving a hardware device installed in an electronic device. In addition, the OS layer 220 may include a runtime and a library accessible to a developer.

There is the framework layer 230 as an upper layer of the OS layer 220. The framework layer 230 links the application layer 240 and the OS layer 220. That is, the framework layer 230 includes a location manager, a notification manager and a frame buffer for displaying a video on a display unit.

The application layer 240 for implementing various functions of the electronic device 100 is located in an upper layer of the framework layer 230. For example, the application layer 240 may include various application programs like a call application 241, a video editing application 242, a camera application 243, a browser application 244, and a gesture application 245.

Furthermore, the OS layer 220 may provide a menu or UI capable of adding or deleting at least one application or application program included in the application layer 240. Accordingly, at least one application or application program included in the application layer 240 may be added or deleted by a user. For example, as described above, the electronic device 100 of FIG. 1 may be connected to another electronic device 102 and 104 or the server 108 via communication. At a user's request, the electronic device 100 may receive and store data (that is, at least one application or application program) from the another electronic device 102 and 104 or the server 108 and include the data in a memory. Herein, the at least one application or application program stored in the memory may be configured and operated in the application layer 240. In addition, at least one application or application program may be selected by a user through a menu or UI provided by the OS layer 220. The at least one application or application program thus selected may be deleted.

Meanwhile, when a user control command input through the application layer 240 is input into the electronic device 100, as the input control command is delivered from the application layer 240 to the hardware layer 210, a specific application corresponding to the command may be implemented and a corresponding result may be displayed in the display device 160.

Figure 3:
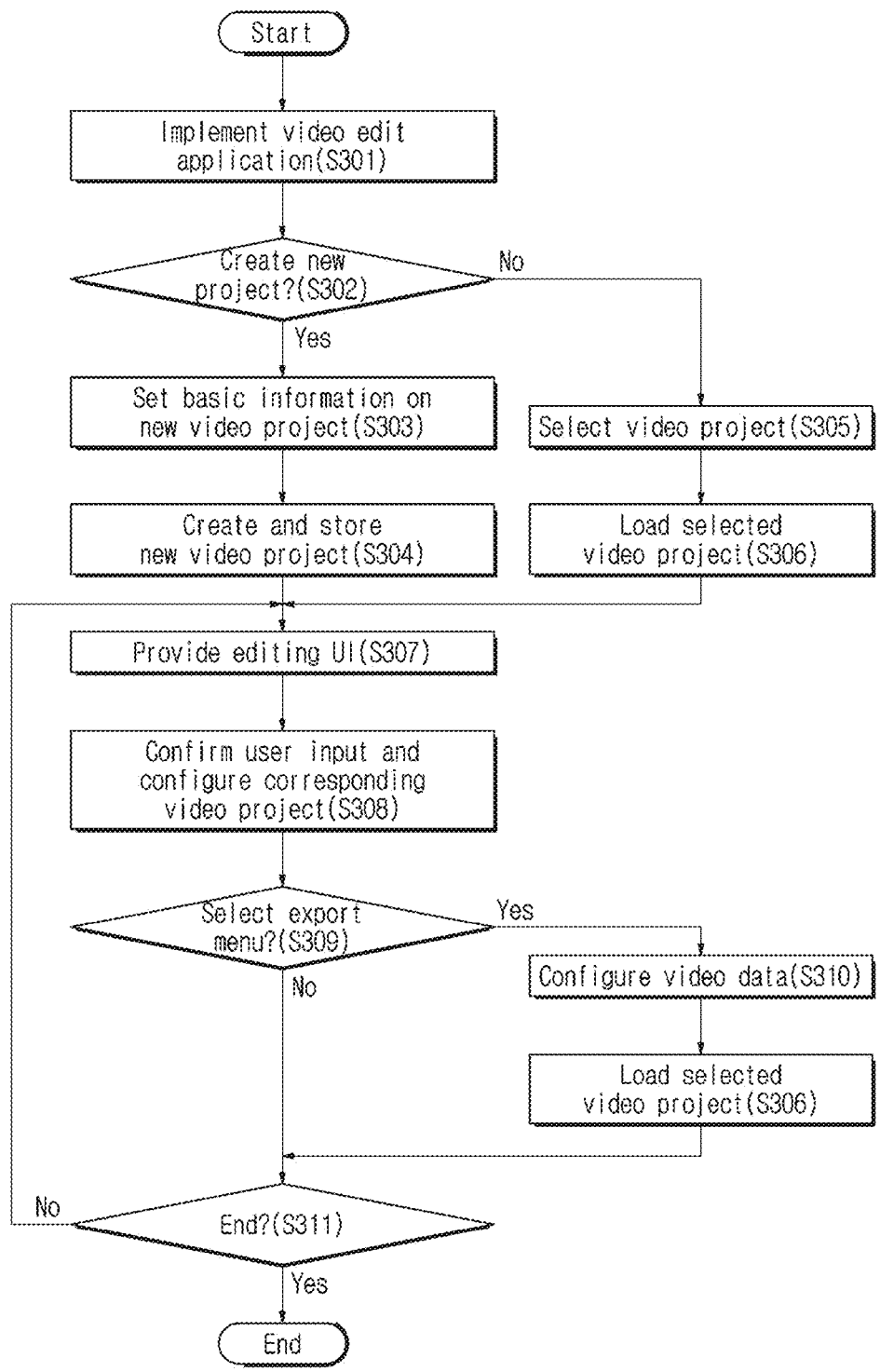
FIG. 3 is a flow chart exemplifying an order of a video editing method to which various embodiments of the present disclosure are applied.
Figure 4:
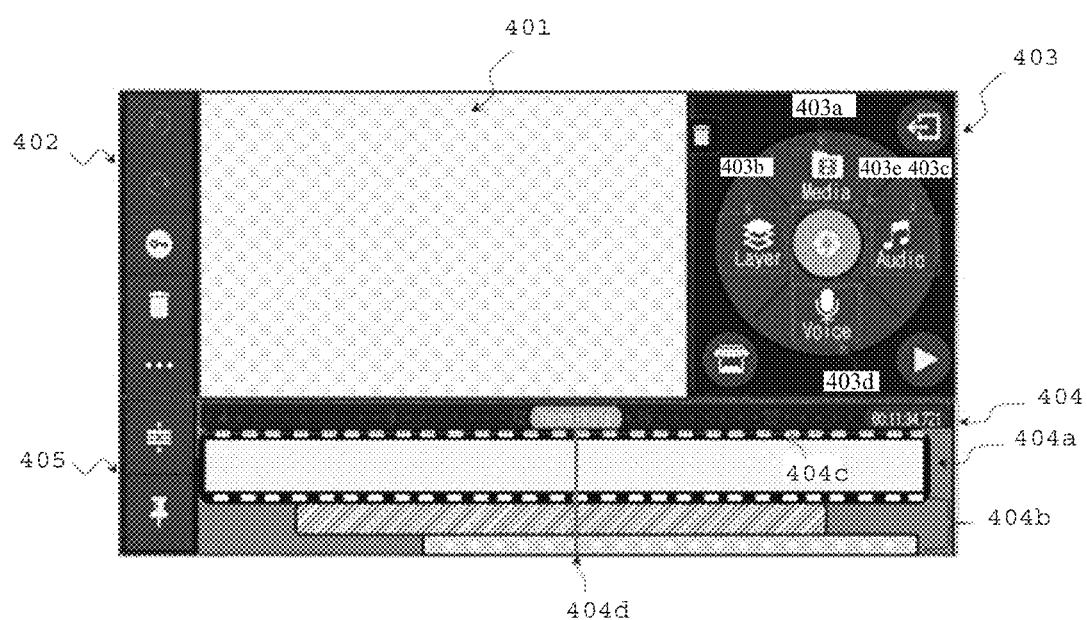
FIG. 4 is a view exemplifying an editing UI provided in a video editing UI control apparatus according to various embodiments of the present disclosure.
Figure 5A:
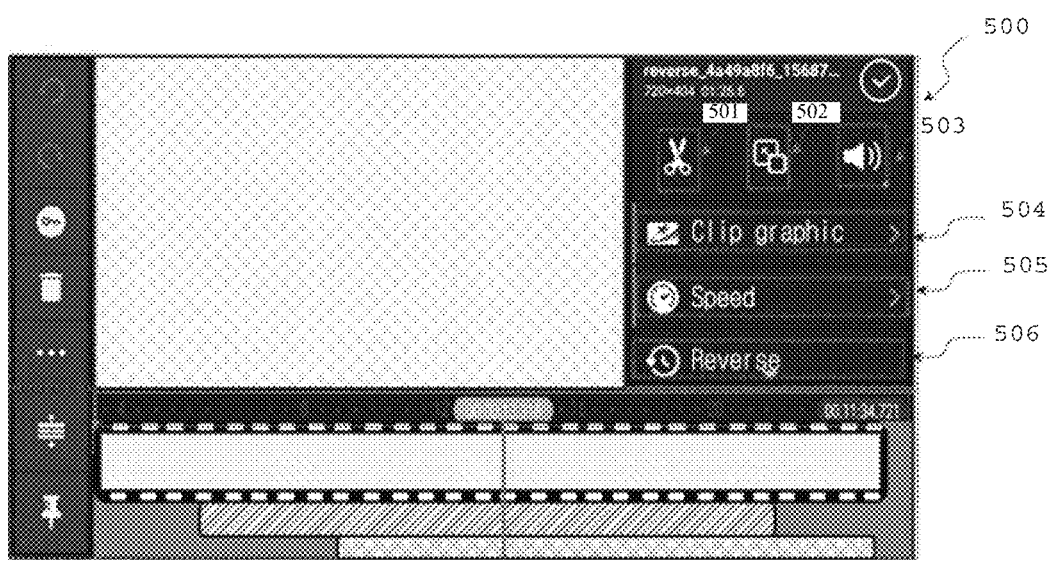
FIG. 5A to FIG. 5E are views exemplifying a clip editing UI provided in a video editing UI control apparatus according to various embodiments of the present disclosure.
Figure 5B:
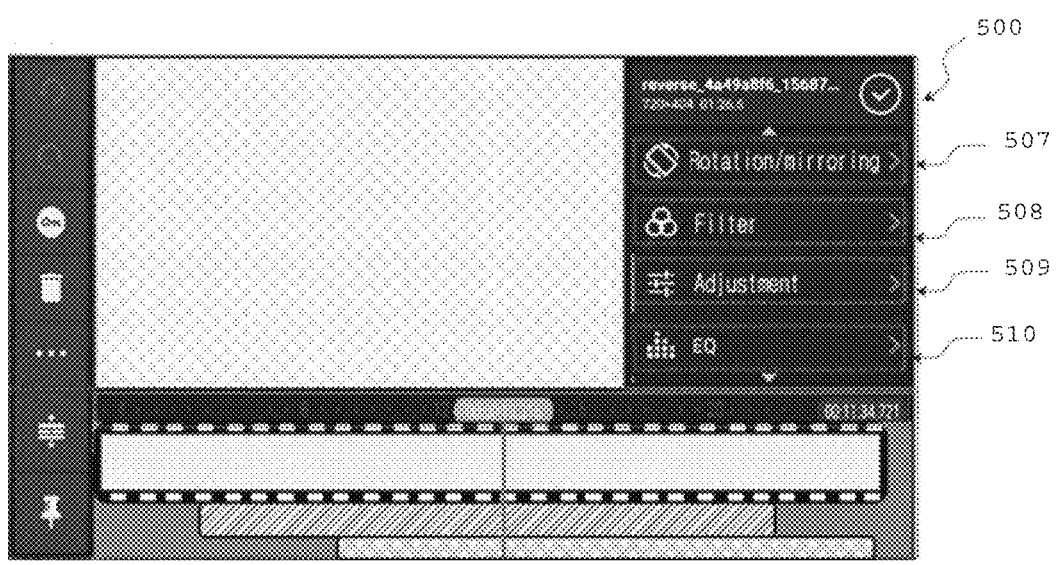
Figure 5C:
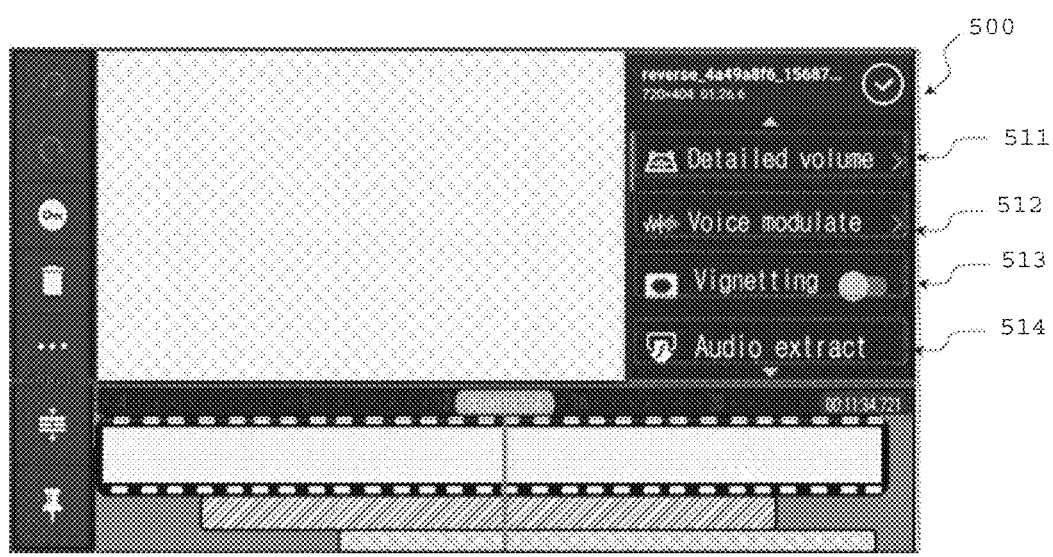
Figure 5D:
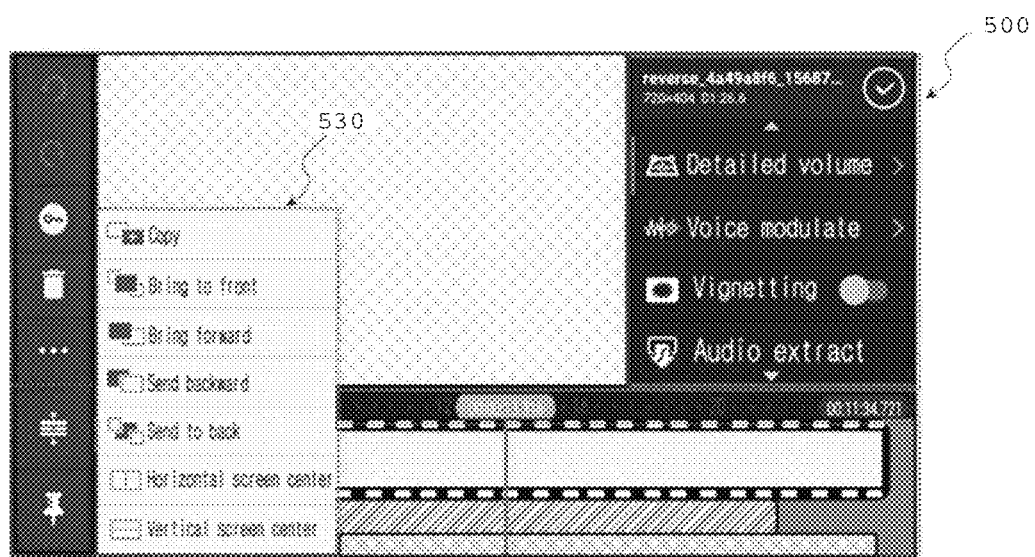
Figure 5E:
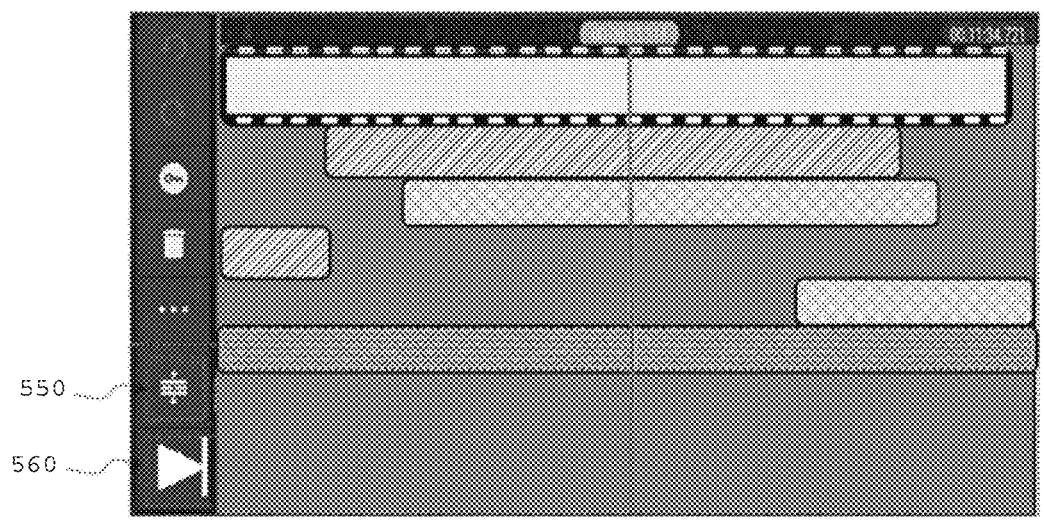

FIG. 3 is a flow chart exemplifying an order of a video editing method to which various embodiments of the present disclosure are applied.

Referring to FIG. 3, first, a video editing method may be implemented by the above-described electronic device, and the implementation may start, when a video editing application is selected and implemented by a user input (S301).

When the video editing application is implemented, the electronic device may output an initial screen of the video editing application to a display device (e.g., display). An initial screen may provide a menu (or UI) for creating a new video project and a video project selection menu (or UI) for selecting a video project already being edited. In such an initial screen, when a menu (or UI) for creating a new video project is selected, the step S303 may be performed. When a video project selection menu (or UI) is selected, the step S305 may be performed.

In the step S303, the electronic device may provide a menu (or UI) for setting basic information of a new video project and set and apply the basic information input through the menu (UI) to the new video project. For example, basic information may include a screen ratio of a new video project. Based on this, the electronic device may provide a menu (or UI) for selecting a screen ratio like 16:9, 9:16 and 1:1 and set and apply a screen ratio input through the menu (UI) to a new video project.

Next, by reflecting basic information set in the step S303, the electronic device may create a new video project and store the new video project thus created in a storing medium (S304).

Although an embodiment of the present disclosure presents a screen ratio as basic information, the present disclosure is not limited to the embodiment, which may be modified in various ways by those skilled in the art. For example, an electronic device may provide a menu (or UI) for setting at least one of the automatic control of master volume, a master volume size, a basic audio fade-in setting, a basic audio fade-out setting, a basic video fade-in setting, a basic video fade-out setting, a basic setting of an image clip, a basic setting of a layer length, and basic settings of image clip pan & zoom. The electronic device may set a value input through the menu (or UI) as basic information of a new video project.

For another example, an electronic device may automatically set predetermined values for automatic control of master volume, a master volume size, a basic audio fade-in setting, a basic audio fade-out setting, a basic video fade-in setting, a basic video fade-out setting, a basic setting of an image clip, a basic setting of a layer length, and basic settings of image clip pan & zoom. In addition, an electronic device may provide a setting menu (or UI) and receive inputs of control values for automatic control of master volume, a master volume size, a basic audio fade-in setting, a basic audio fade-out setting, a basic video fade-in setting, a basic video fade-out setting, a basic setting of an image clip, a basic setting of a layer length, and basic settings of image clip pan & zoom. The electronic device may also set the above-described basic information according to the input values.

Meanwhile, in the step S305, the electronic device may provide a project list including a video project stored in the storing medium and an environment in which at least one video project included in the project list may be selected. Through the environment described above, a user may select at least one video project included in the project list, and the electronic device may load at least one video project selected by the user (S306).

In the step S307, the electronic device may provide an editing UI. The editing UI may include a video display window 401, a media setting window 402, a media input window 403, a clip display window 404, and a clip setting window 405. In an editing UI, a video display window, a media setting window and a media input window may appear in the upper part of the display, while a clip display window and a clip setting window may appear in the lower part of the display.

The media setting window may include an export menu, a capture menu and a setting menu. The export menu, the capture menu and the setting menu may be provided in forms of icon or text enabling these menus to be recognized.

The media input window may include a media input menu 403A, a layer input menu 403B, an audio input menu 403C, a voice input menu 403D and a shooting menu 403E. The media input menu 403A, the layer input menu 403B, the audio input menu 403C, the voice input menu. 403D and the shooting menu 403E may be provided in forms of icon or text enabling these menus to be recognized. In addition, each menu may include a sub-menu. When each menu is selected, the electronic device may configure and display a corresponding sub-menu.

For example, the media input menu 403A may be connected to a media selection window as a sub-menu, and the media selection window may provide an environment in which media stored in a storing medium can be selected. The media selected through the media selection window may be inserted into and displayed in a clip display window. The electronic device may confirm a type of media selected through the media selection window. The electronic device may set a clip time of the media and insert and display the clip time in the clip display window by considering the confirmed type of media. Here, the type of media may include an image, a video and the like. When the type of media is an image, the electronic device may confirm a basic set value of length of an image clip and set an image clip time according to the basic set value of length of the image clip. In addition, when the type of media is a video, the electronic device may set a video clip time according to the length of the video.

The layer input menu 403B may include, as sub-menus, a media input menu, an effect input menu, an overlay input menu, a text input menu, a media input menu, and a drawing input menu.

A media input menu may be configured in a same way as the above-described media input menu.

An effect input menu may provide an environment to select a blurring effect, a mosaic effect, a noise effect, a sandstorm effect, a melting point effect, a crystal effect, a star filter effect, a display board effect, a haze effect, a fisheye lens effect, a magnifying lens effect, a flower twist effect, a night vision goggle effect, and a sketch effect. An effect selected through the effect input menu may be inserted and displayed in a clip display window. Herein, an electronic device may confirm a basic set value of layer length and set an effect clip time according to the basic set value of layer length.

An overlay input menu may provide an environment to select various forms or shapes of stickers and icons. A sticker and an icon selected through the overlay input menu may be inserted and displayed in a clip display window. Herein, an electronic device may confirm a basic set value of layer length and set clip time for sticker, icon and the like according to the basic set value of layer length.

A text input menu may provide an environment to input a text, that is, a QWERTY keyboard. A text selected through the text input menu may be inserted and displayed in a clip display window. Herein, an electronic device may confirm a basic set value of layer length and set a text clip time according to the basic set value of layer length.

A drawing input menu may provide a drawing area to a video display window and be configured such that a drawing object is displayed in a touch input area of the video display window. A handwriting input menu may include, as sub-menus, a drawing tool selection menu for selecting a drawing tool, a color selection menu for selecting a drawing color, a thickness setting menu for setting thickness of a drawing object, a partial delete menu for deleting a created drawing object, and an entire delete menu for deleting an entire object that has been drawn. In addition, when a handwriting input menu is selected, an electronic device may confirm a basic set value of layer length and set a drawing object clip time according to the basic set value of layer length.

The audio input menu 403C may be connected to an audio selection window as a sub-menu. The audio selection window may provide an environment to select an audio file stored in a storage medium. An audio file selected through the audio selection window may be inserted and displayed in a clip display window.

The voice input menu 403D may be a menu for recording a sound input through a microphone. When the voice input menu is selected by a user, an electronic device may detect an audio signal input through a microphone by activating the microphone included in the electronic device. In addition, the electronic device may show a start recording button. When the start recording button is input, audio signals may start being recorded. Furthermore, the electronic device may visually display audio signals input through the microphone. For example, the electronic device may confirm a size or frequency feature of an audio signal and display the feature thus confirmed in a form of level meter or graph.

The shooting menu 403E is a menu for shooting an image or a video that is input through a camera module provided to an electronic device. The shooting menu 403E may be shown by an icon or the like visualizing a camera device. The shooting menu 403E may include an image/video shooting selection menu, as a sub-menu, for selecting a camera for capturing an image or a camcorder for shooting a video. Based on this, when the shooting menu 403E is selected by a user, the electronic device may display the image/video shooting selection menu. In addition, the electronic device may activate an image shooting mode or a video shooting mode of a camera module according to what is selected through the image/video shooting selection menu.

The clip display window 404 may include at least one clip line for displaying clips corresponding to media, effects, overlays, texts, drawings, audio or speech signals that are input through the media input window.

A clip line may include a main clip line 404A and a sub clip line 404B. The main clip line 404A may be a clip line provided at the top of a clip display window, and the sub clip line 404B may be at least one clip line provided below the main clip line 404A.

An electronic device may display the main clip line 404A by fixing the main clip line 404A at the top of a clip display window. The electronic device may confirm a drag input in an area, in which the sub clip line 404B exists, and display the sub clip line 404B by scrolling the sub clip line 404B up and down in response to a direction of the drag input.

Furthermore, when the direction of the drag input is an upward direction, the electronic device may display the sub clip line 404B by moving the sub clip line 404B to an upper area. When the direction of the drag input is a downward direction, the electronic device may display the sub clip line 404B by moving the sub clip line 404B to a lower area. In addition, the electronic device may differently display the vertical width of the main clip line 404A in response to the movement of the sub clip line 404B. For example, when the sub clip line 404B moves upwards, the vertical width of the main clip line 404A may be decreased. When the sub clip line 404B moves downwards, the vertical width of the main clip line 404A may be increased.

In particular, a clip display window may include a time display line 404C for indicating a time of a video project and a play head 404D. The time display line 404C may be displayed on top of the main clip line 404A described above and include figures or ticks in predetermined units. In addition, the play head 404D may be displayed as a vertical line starting from the time display line 404C to the bottom of the clip display window. The play head 404D may be shown in a color (e.g., red) that may be easily recognized by a user.

Furthermore, the play head 404D may be provided with a fixed form in a predetermined area. Objects included in the main clip line 404A and the sub clip line 404B and the time display line 404C, which are provided in the clip display window, may be so configured as to move horizontally.

For example, when a drag input horizontally occurs in an area in which the main clip line 404A, the sub clip line 404B and the time display line 404C are located, the electronic device may horizontally move and display the time display line 404C and objects included in the main clip line 404A and the sub clip line 404B. Herein, a frame or an object corresponding to the play head 404D may be so configured as to be displayed in the video display window. Also, the electronic device 404D may confirm a detailed time (e.g., 1/1000 second unit), in which the play head is touched, and also display the confirmed detailed time in the clip display window.

In addition, the electronic device may check whether or not multiple touches occur in the clip display window. When multiple touches occur, the electronic device may respond to the multiple touches by changing and displaying a tick or figure in a predetermined unit included in the time display line 404C. For example, when an input is detected with a gradually decreasing interval of multiple touches, the electronic device may display a tick or figure by decreasing an interval of the tick or figure. When an input is detected with a gradually increasing interval of multiple touches, the electronic device may display the tick or figure by increasing the interval of the tick or figure.

The electronic device may configure the clip display window 404 such that a clip displayed in a clip line may be selected. When the clip is selected, the electronic device may visually show that the clip is selected. For example, when the electronic device detects that a clip is selected, the electronic device may display a boundary of the selected clip in a predetermined color, for example, yellow.

Preferably, when it is detected that a clip is selected, the electronic device may provide a clip editing UI capable of editing the selected clip. For example, the electronic device may display a clip editing UI in an area where the media input window 403 exists. A clip editing UI may be differently set according to the type of a selected clip. Specifically, when a type of clip is a video clip, the electronic device configure and provide a clip editing UI 500 by including a trim/split menu 501, a pan/zoom menu 502, an audio control menu 503, a clip graphics menu 504, a speed control menu 505, a reverse control menu 506, a rotation/mirroring control menu 507, a filter menu 508, a brightness/contrast adjustment menu 509, a voice EQ control menu 510, a detailed volume control menu 511, a voice modulation menu 512, a vignetting control menu 513, and an audio extraction menu 514.

A clip editing UI for each clip type may be configured based on the structures of video editing UIs in FIG. 7A to FIG. 7G below. A clip editing UI may be configured with reference to FIG. 7A to FIG. 7G.

In addition, the electronic device may further display a clip editing expansion UI 530 in an area in which a media setting window exists. A clip editing expansion UI displayed in an area of media setting window may be also differently set according to a type of a selected clip. For example, when a type of clip is a video clip, an image clip, an audio clip or a voice signal clip, the electronic device may configure and provide the clip editing expansion UI 530 including a clip delete menu, a clip copy menu and a clip layer copy menu. When a type of clip is an effect clip, a text clip, an overlay clip or a drawing clip, the electronic device may configure and provide the clip editing expansion UI including a clip delete menu, a clip copy menu, a bring to front menu, a bring forward menu, a send backward menu, a send to back menu, a horizontal center alignment menu, and a vertical center alignment.

A clip setting window may include a clip expansion display menu 550 and a clip movement control menu 560. When the clip expansion display menu 550 is selected by a user, the electronic device may display a clip display window by expanding the window to the entire area of display. In addition, when the clip movement control menu 560 is selected, the electronic device may display a clip by moving the clip to a play head. Furthermore, the clip movement control menu 560 may include a start area movement menu or an end area movement menu. The start area movement menu or the end area movement menu needs to be adaptively displayed by considering the position of a play head touching a clip. For example, the electronic device may basically provide the start area movement menu. When a clip touches the start position of a play head, the start area movement menu may be replaced by the end area movement menu.

In the step S308, the electronic device may confirm a user input that is input through an editing UI, configure a corresponding video project and store the configured video project in a storage medium.

As described above, an editing UI may be configured to include an export menu in a media setting window. When the export menu is selected by a user (e.g., S309), the electronic device may configure video data by reflecting information that is configured in a video project and store the video data in a storage medium (S310).

Figure 6:
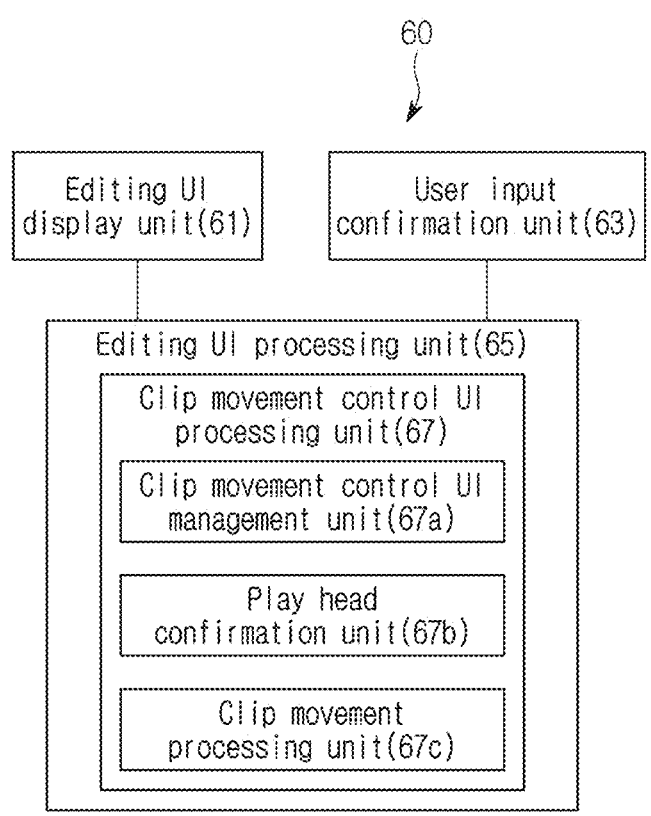
FIG. 6 is a block diagram exemplifying a configuration of a video editing UI control apparatus according to various embodiments of the present disclosure.
Figure 7C:
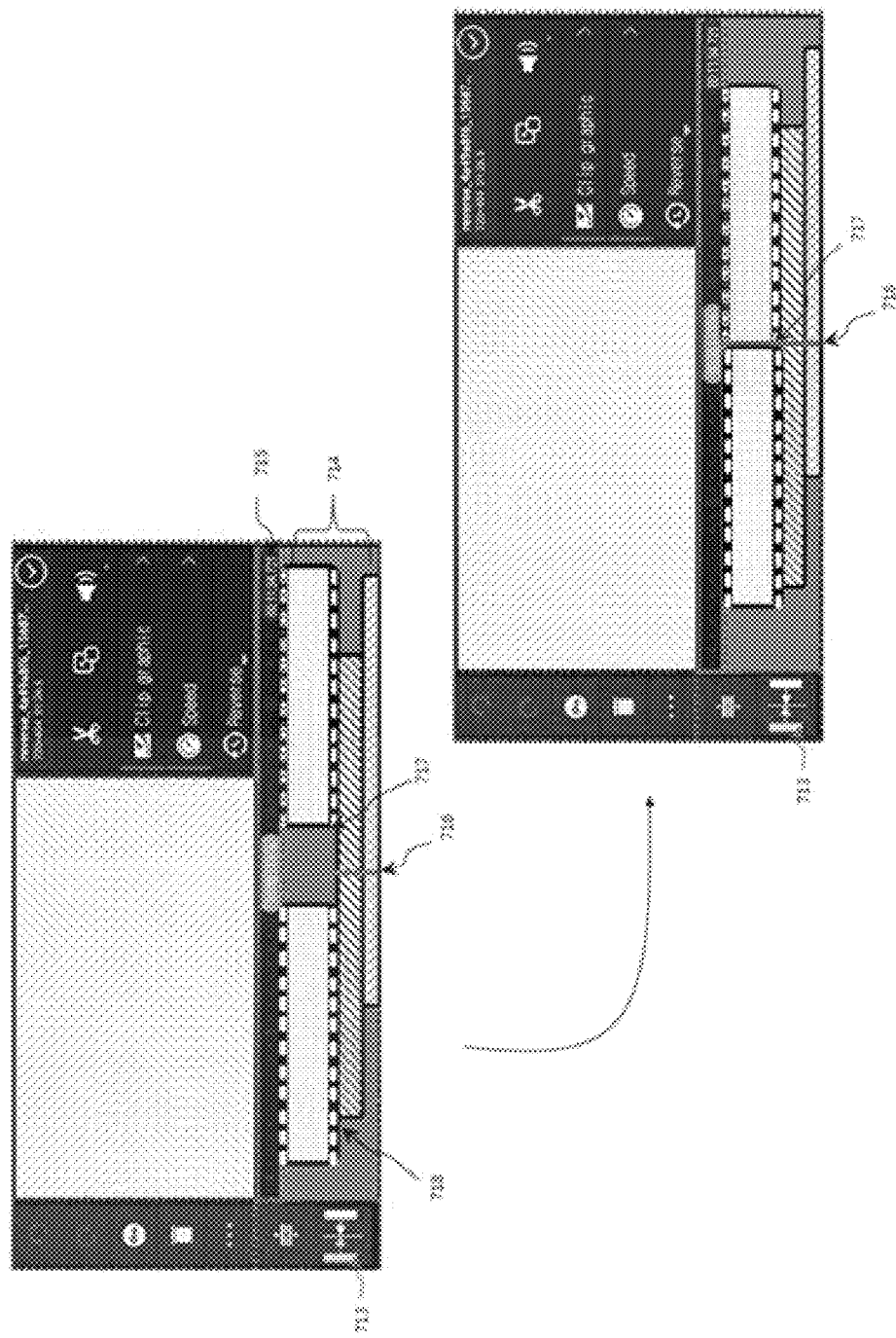
Figure 7D:
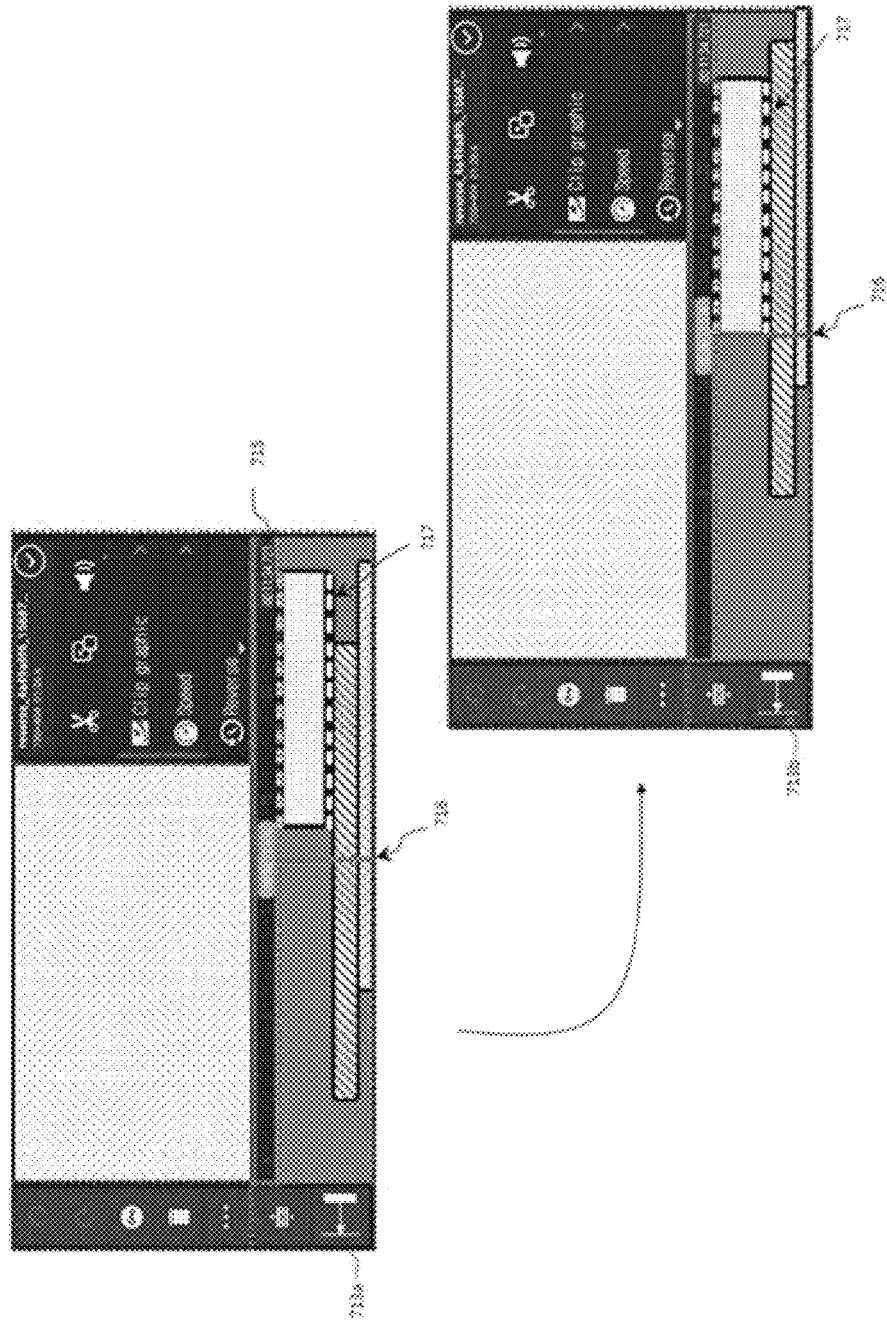
Figure 7E:
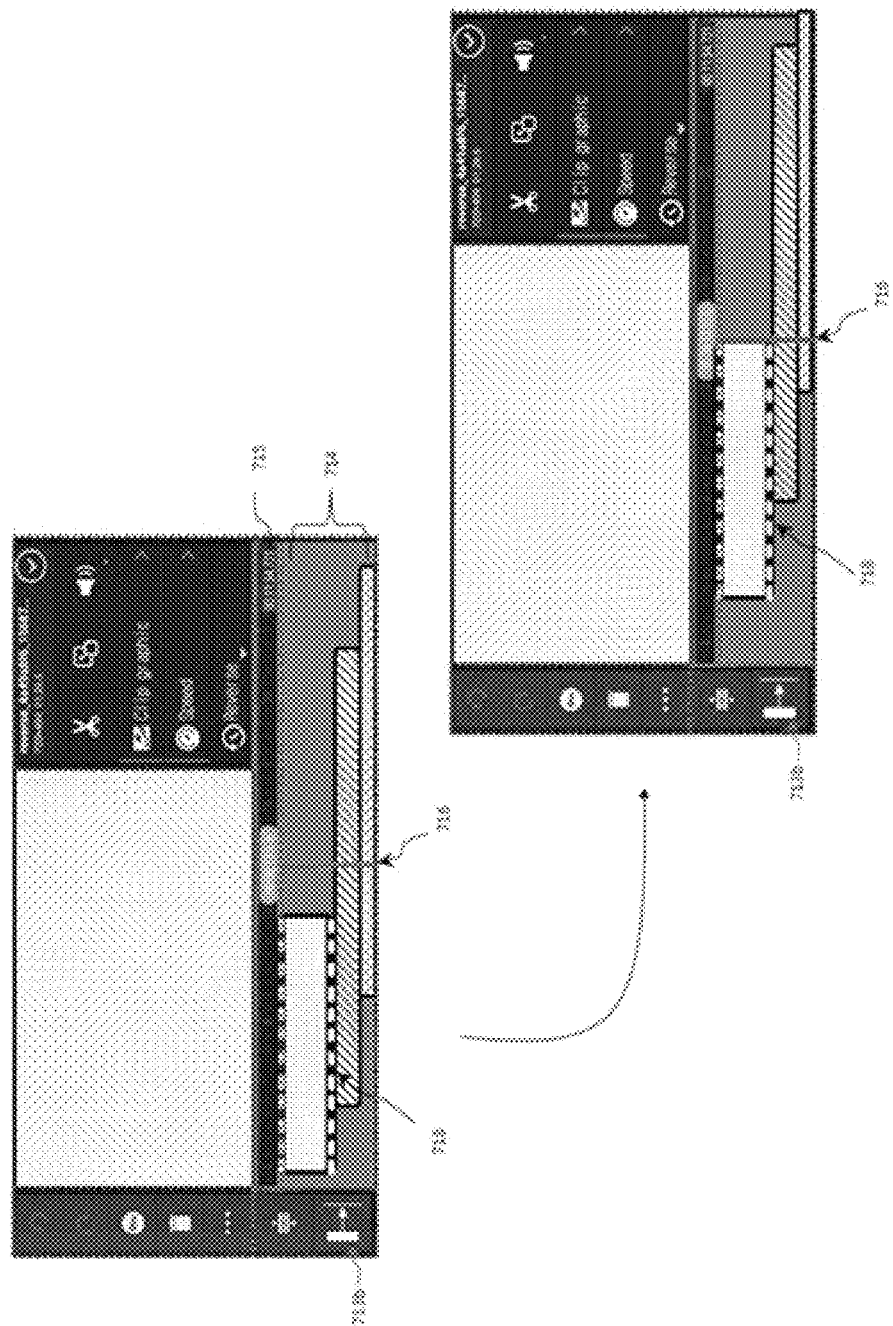
Figure 7F:
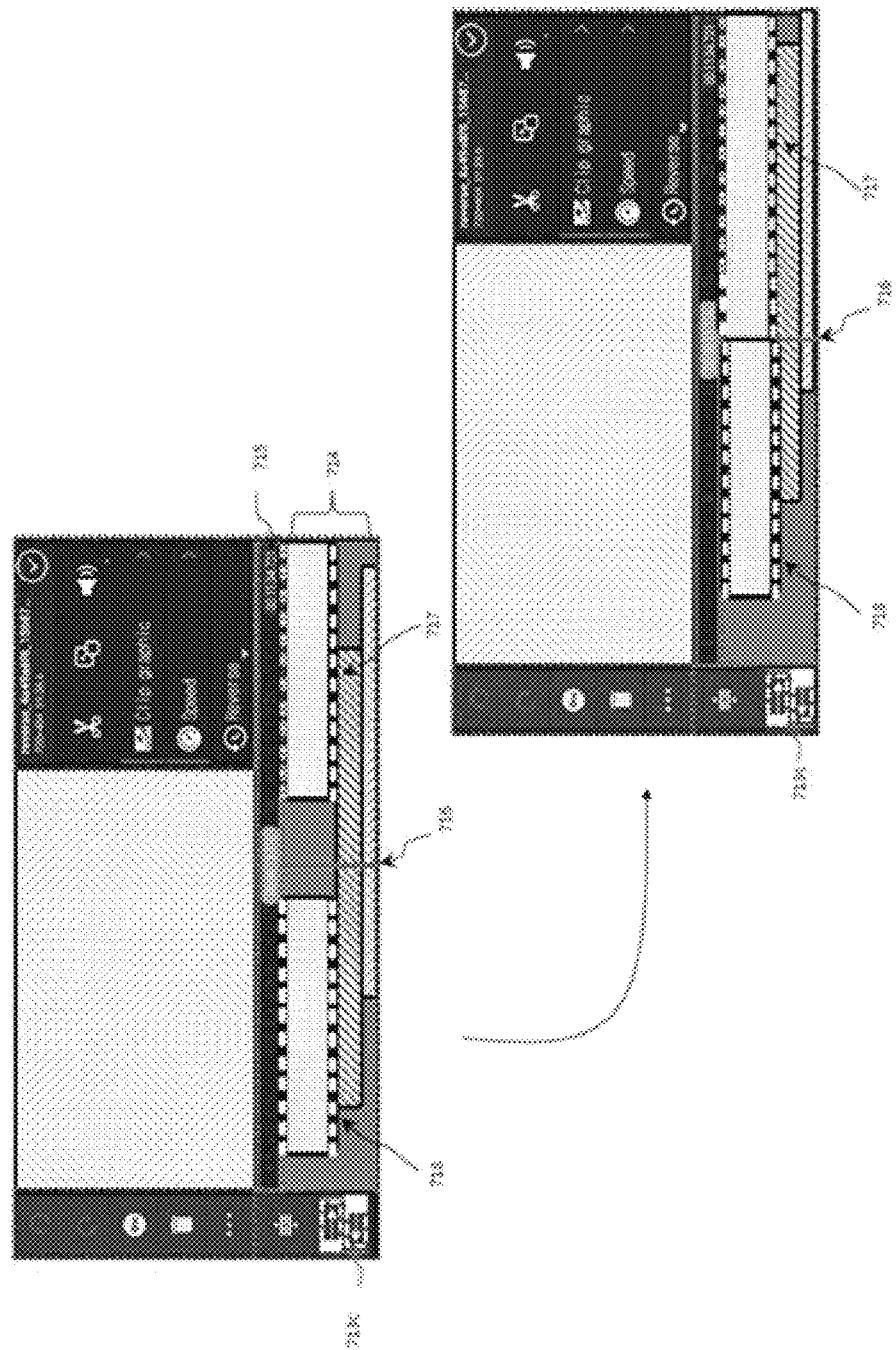
Figure 7G:
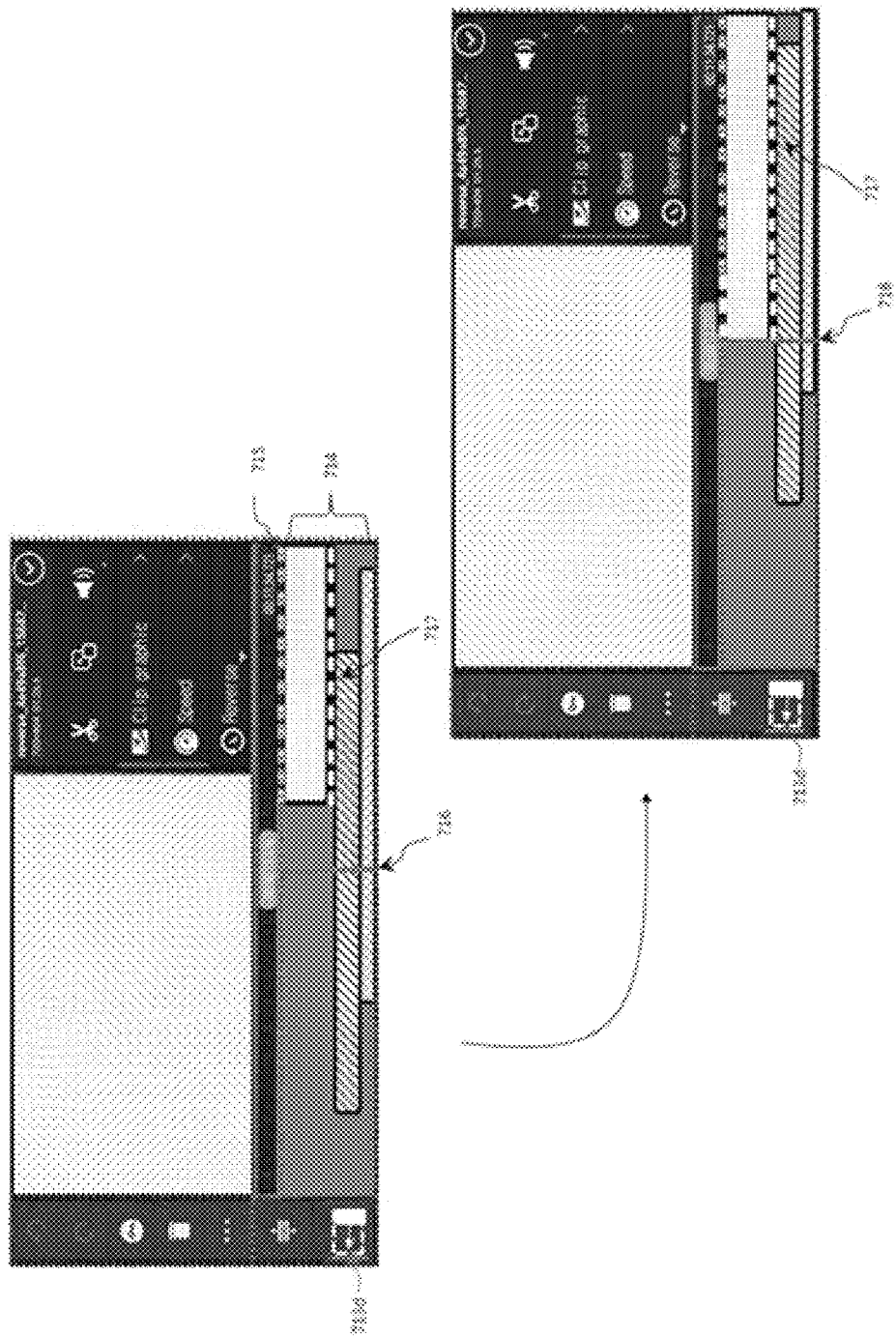

FIG. 6 is a block diagram exemplifying a configuration of a video editing UI control apparatus according to various embodiments of the present disclosure.

Referring to FIG. 6, a video editing UI control apparatus 60 according to various embodiments of the present disclosure may include an editing UI display unit 61, a user input confirmation unit 63 and an editing UI processing unit 65.

The editing UI display unit 61 may visually display the above-described editing UI in a display device (e.g., a display). In particular, the editing UI display unit 61 may confirm a menu or UI, which is to be output at the request of the editing UI processing unit 65, and output the menu or UI in the display device (e.g., the display). Herein, the editing UI may include at least one menu or UI having a predetermined form and size and be configured such that at least one menu or UI is displayed in a predetermined area.

An editing UI, which the editing UI display unit 61 outputs through a display, will be described in detail with reference to FIGS. 7A to 7H below.

Based on a coordinate of a touch-input area, the number of touch-input areas and a touch-input gesture that are provided through the above-described display device 160 (refer to FIG. 1), the user input confirmation unit 63 may confirm user input information such as a coordinate of a user input, a type of a user input (e.g., a single touch input, a multi touch input, a single gesture input, a multi gesture input, etc.) and a direction of (single or multi) gesture input and provide the confirmed user input information to the editing UI processing unit 65.

The editing UI processing unit 65 may confirm the user input information provided by the user input confirmation unit 63 and process an operation corresponding to the user input information. For example, the editing UI processing UI 65 may confirm a coordinate of user input and conform and process an operation corresponding to a menu or UI that exists at the confirmed coordinate. As another example, the editing UI processing unit 65 may confirm a sub-menu or sub-UI of the menu or UI, which exists at the confirmed coordinate, and request the editing UI display unit 61 to output the confirmed sub-menu or sub-UI.

Particularly, the editing UI processing unit 65 may include a clip movement control UI processing unit 67 for providing a clip movement control UI. The clip movement control UI processing unit 67 may include a clip movement control UI management unit 67A, a play head confirmation unit 67B and a clip movement processing unit 67C.

A clip movement control UI may include a menu or UI that controls a clip movement by using a play head. For example, the clip movement control UI may include a UI that moves a start point or end point of a clip to the play head. In addition, as a clip movement basically requires confirming or selecting a clip to be moved, a clip movement control UI may be provided or enabled after the clip is confirmed or selected.

Based on the foregoing description, the clip movement control UI management unit 67A may confirm the selection of at least one clip, detect a clip movement control UI and request the editing UI display unit 61 to output the clip movement control UI. As another example, the clip movement control UI management unit 67A may basically request the editing UI display unit 61 to display a clip movement control UI in disabled state. When at least one clip is confirmed to be selected, the clip movement control UI management unit 67A may request the editing UI display unit 61 to enable the clip movement control UI.

It is preferable to configure a clip movement control UI to be displayed in a clip setting window 710 of an editing UI. Furthermore, an electronic device to which a video editing UI control apparatus is applied may be a portable terminal. Such a portable terminal may make it difficult to configure a plurality of menus or UIs in the clip setting window 710. In this regard, a clip movement control UI may be provided as an extended menu 711 of the clip setting window 710. For example, when at least one clip 701 is selected, the clip movement control UI management unit 67A may request the editing UI display unit 61 to display the extended menu in the clip setting window 710. In response to this, the editing UI display unit 61 may configure and display the extended menu 711 in the clip setting window 710 or in one area of the clip setting window 710.

As another example, the clip movement control UI management unit 67A may request the editing UI display unit 61 to output a clip movement control UI. The editing UI display unit 61 may display a clip movement control UI 713 in place of some menu 712 (refer to FIG. 7B) in the clip setting window 710. For example, the editing UI display unit 61 may be configured to basically display a play head alignment menu 712 and to display the clip movement control UI 713 in place of the play head alignment menu 712, when the clip movement control UI management unit 67A requests to display the clip movement control UI 713. Herein, as the play head alignment menu 712 is a menu for moving the play head to a start or end point of a selected clip, a reference time for movement may be set to the time of either the start point or end point of the clip.

The editing UI processing unit 65 may move layers 714 provided in a clip display window left and right, and up and down, in response to user input information occurring in the clip display window. Particularly, when a drag input to the left or right in a clip display window is confirmed, the editing UI processing unit 65 may move the layers 714 provided in the clip display window to the left or right, together with a time display line 715. Herein, a time (hereinafter, referred to as "reference time") corresponding to a play head 716 may be confirmed and displayed.

In response to the operation of the editing UI processing unit 65, the play head confirmation unit 67B may confirm and temporarily store a reference time and provide the reference time at a request of the clip movement processing unit 67C.

When the above-described clip movement control UI 713 is output through the editing UI display unit 61, the clip movement processing unit 67C may confirm the occurrence of a user input in an area, in which the clip movement control UI 713 is displayed, and process a corresponding clip movement. Specifically, the clip movement processing unit 67C may confirm that a user input occurs in an area in which the clip movement control UI 713 (refer to FIG. 7C), and may request a reference time to the play head confirmation unit 67B and receive the reference time. In addition, the clip movement processing unit 67C may move a start point or end point of a selected clip 717 and 718 based on the confirmed time.

As another example, when moving the layers 714 provided in a clip display window to the left or right according to a user input, the clip movement control UI management unit 67A may manage the clip movement control UI 713 to be adaptively displayed by considering the play head 716 and the position of a start or end point of the selected clip 717. For example, when the start point of the selected clip 717 is located in an area to the left of the play head 716, the clip movement control UI management unit 67A may enable a clip start point movement UI 713A (refer to FIG. 7D) to be displayed. When the end point of the selected clip 718 is located in an area to the might of the play head 716, the clip movement control UI management unit 67A may enable a clip end point movement UI 713B (refer to FIG. 7E) to be displayed.

In an embodiment of the present disclosure described above, the clip movement control UI 713 includes the clip movement control UIs 713, 713A and 713B. However, the present disclosure is not limited to the embodiment. Various menus or UIs capable of controlling a clip or layer based on a play head or a time corresponding to the play head may be included in a clip movement control UI. For example, a clip movement control UI may include a clip extension UI 713C. As the clip extension UI 713C is a menu for extending a clip to a play head or a time corresponding to the play head, the clip movement processing unit 67C may extend a start point or end point of a clip to the play head 716 or a time corresponding to the play head 716, in response to a selection of the clip extension UI 713C.

As another example, the clip extension UI 7130 may include a stark point extension UI 713D (refer to FIG. 7G) or an end point extension UI 713E (refer to FIG. 7H). The clip movement processing unit 67C may extend a start point of a clip 717 to the play head 716 or a time corresponding to the play head 716 in response to a selection of the start point extension UI 713D and extend an end point of a clip 718 to the play head 716 or a time corresponding to the play head 716 in response to a selection of the end point extension UI 713E.

Hereinafter, an operation of providing a clip movement control UI will be described with reference to FIGS. 7A to 7H described above and FIG. 8.

Figure 8:
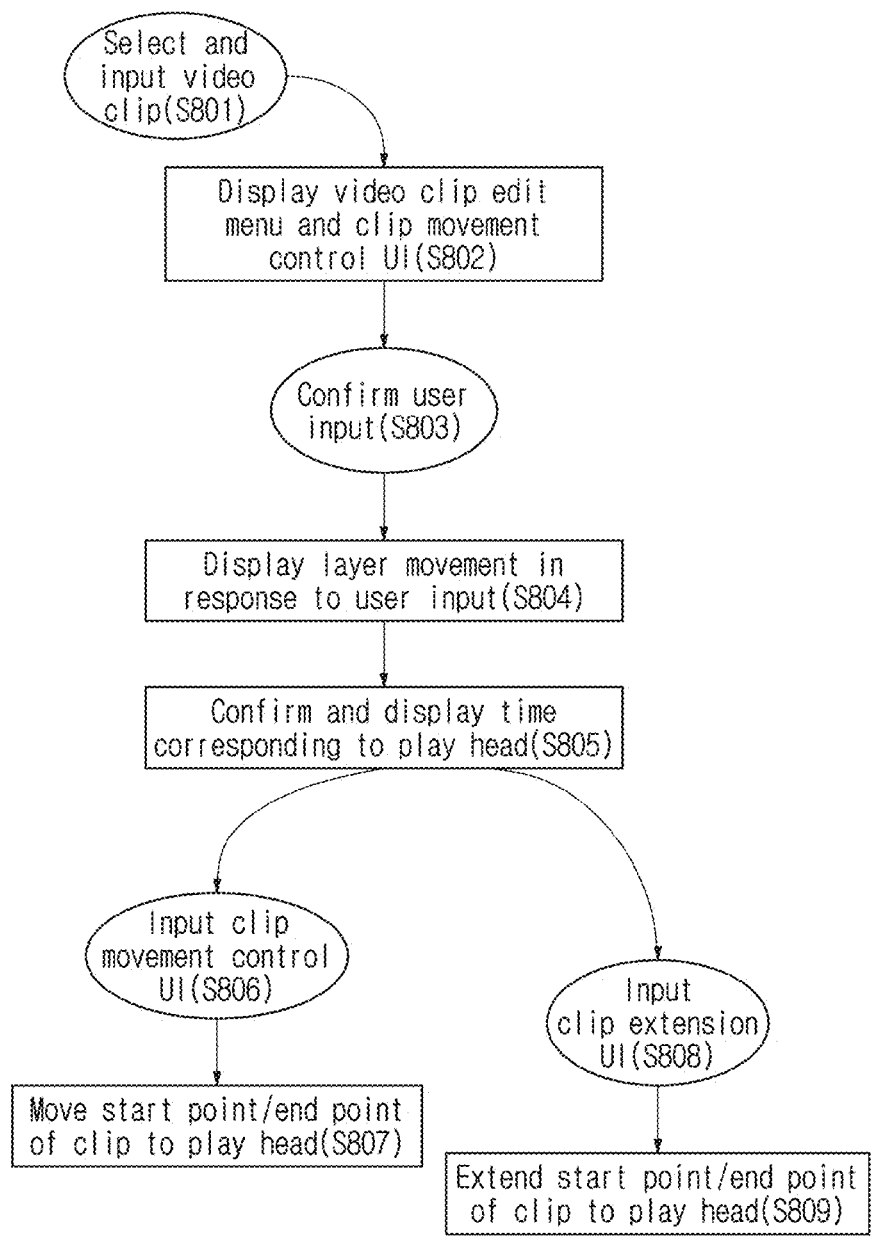
FIG. 8 is an exemplary diagram of operation in which a clip movement control UI is provided by a video editing UI control apparatus according to various embodiments of the present disclosure.

FIG. 8 is an exemplary diagram of operation in which a clip movement control UI is provided by a video editing UI control apparatus according to various embodiments of the present disclosure.

First, the video editing UI control apparatus may provide a video editing UI including a video display window, a media setting window, a media input window, a clip display window and a clip setting window. At least one clip included in the clip display window may be selected (S801). For example, the video editing UI control apparatus may confirm that a video clip is selected among multiple clips displayed in a clip display window, when a touch input occurs in an area 701 in which the video clip exists.

In response, the video editing UI control apparatus may confirm a UI for editing a video clip, that is, a video clip edit menu, and replace the media input window 700 (refer to FIG. 7A) by the video clip edit menu 705. In addition, the video editing UI control apparatus may confirm and display a clip movement control UI 713 (S802).

Next, the video editing UI control apparatus may confirm a user input occurring in the video clip edit menu 705 or the clip movement control UI 713 (S803) and then process a corresponding operation. Particularly, as the video editing UI control apparatus may confirm a user input occurring in the clip display window 707 (refer to FIG. 7B), when a drag input occurs in the clip display window 707, the video editing UI control apparatus may move at least one layer provided in the clip display window 707 in a direction of the drag input (S804). For example, when a drag input to the left or right in the clip display window 707 is confirmed, the video editing UI control apparatus may move the layers 714 provided in the clip display window 707 to the left or right, together with the time display line 715. Herein, a reference time may be confirmed and displayed (S805).

In the foregoing environment, when a user input occurs in an area in which the clip movement control UI 713 is displayed (S806), the video editing UI control apparatus may process a corresponding clip movement (S807), That is, the video editing UI control apparatus may confirm that a user input occurs in an area in which the clip movement control UI 713 exists, and confirm a reference time. In addition, the video editing UI control apparatus may move the start points or end points of the selected clips 717 and 718 to the confirmed time.

In addition, the clip movement control UI 713 may include the clip extension UI 713C. In response, when a user input occurs in an area in which the clip extension UI 713C is displayed (S808), the video editing UI control apparatus may extend the start points or end points of the corresponding clips 717 and 718 to the play head 716 (S809).

FIG. 8 illustrates an embodiment in which the clip movement control UI moves or extends a selected clip without distinction between a start point and an end point. However, the present disclosure is not limited to the embodiment, and a selected clip may be moved or extended in various ways. For example, a clip movement control UI may include the clip start point movement UI 713A for moving a start point of a clip to a reference time, the clip end point movement UI 713B for moving an end point of a clip to a reference time, the start point extension UI 713C for extending a start point of a clip to a reference time, and the end point extension UI 713D for extending an end point of a clip to a reference time. Hereinafter will be described, referring to FIG. 9, operations of providing and controlling the clip start point movement UI 713A, the clip end point movement UI 713B, the start point extension UI 713C and the end point extension UI 713D.

Figure 9:
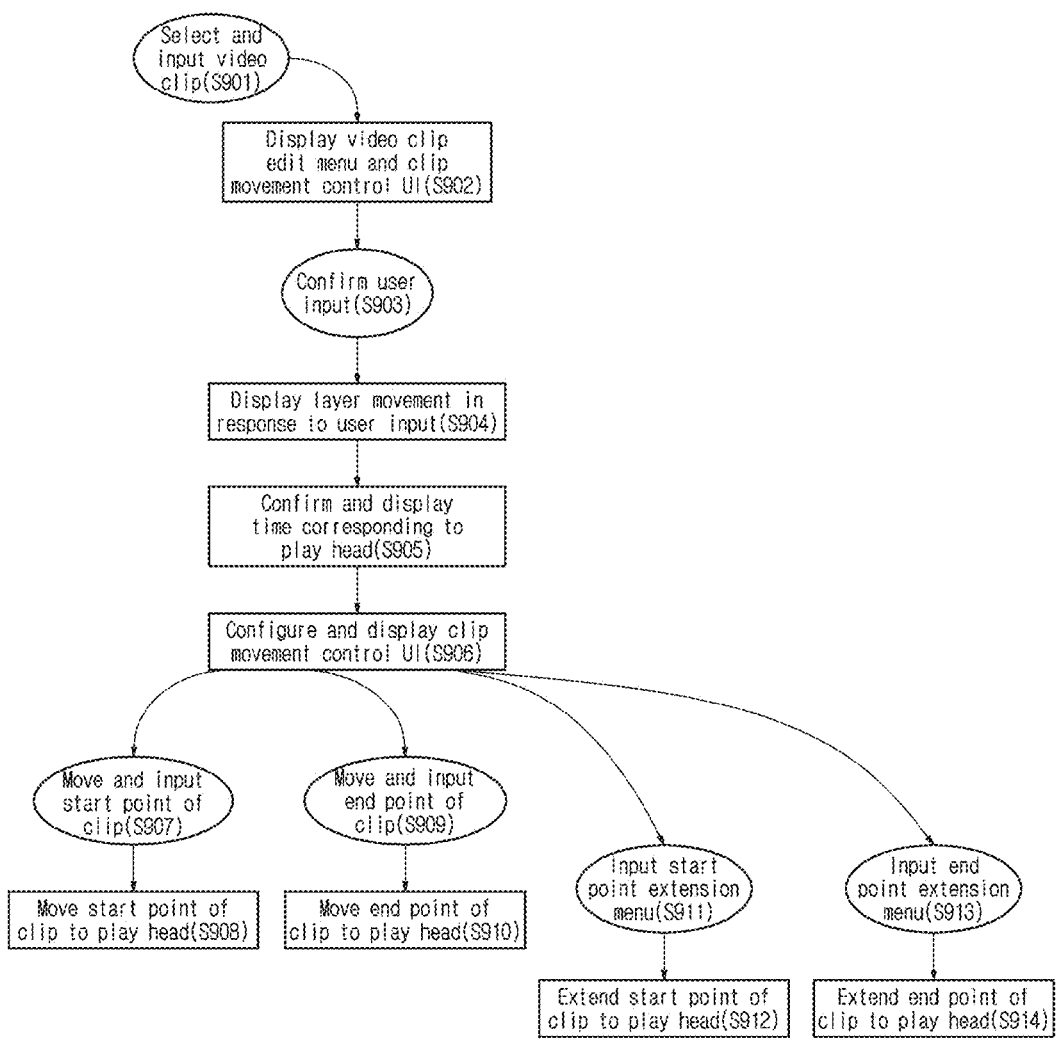
FIG. 9 is another exemplary diagram of operation in which a clip movement control UI is provided by a video editing UI control apparatus according to various embodiments of the present disclosure.

FIG. 9 is another exemplary diagram of operation in which a clip movement control UI is provided by a video editing UI control apparatus according to various embodiments of the present disclosure.

First, the steps S901 to S905 may be configured to be the same of the steps S801 to S805 of FIG. 8 described above.

Next, the video editing UI control apparatus n may adaptively configure the clip movement control UI 713 according to a user input confirmed in the step S903 and display the clip movement control UI 713 (S906). Specifically, when moving the layers 714 provided in the clip display window 707 to the left or right according to a user input, the video editing UI control apparatus may adaptively display the clip movement control UIs 713A and 713B by considering the play head 716 and the positions of start or end points of the selected clips 717 and 718. For example, when the start point of the selected clip 717 is located in an area to the left of the play head 716, the video editing UI control apparatus may enable the clip start point movement UI 713A to be displayed. When the end point of the selected clip 718 is located in an area to the right of the play head 716, the video editing UI control apparatus may enable the clip end point movement UI 713B to be displayed.

In the foregoing environment, when a user input occurs in an area in which the clip movement control UI 713A is displayed (S907), the video editing UI control apparatus may process a corresponding clip movement (S908). That is, the video editing UI control apparatus may confirm that a user input occurs in an area in which the clip start point movement control UI 713A exists, and confirm a reference time. In addition, the video editing UI control apparatus may move the start point of the selected clip 717 to the confirmed reference time.

Likewise, when confirming that a user input occurs in an area in which the clip end point movement UI 713B (refer to FIG. 7D) (S909), the video editing UI control apparatus may confirm a reference time and move the end point of the selected clip 718 to the confirmed reference time (S910).

In addition, the clip movement control UI 713 may include the start point extension UI 713D and the end point extension UI 713E. In response, when a user input occurs in an area in which the start point extension UI 713D is displayed (S911), the video editing UI control apparatus may extend the start point of the corresponding clip 717 to the play head 716 (S912). That is, the video editing UI control apparatus may confirm that a user input occurs in an area in which the start point extension UI 713D exists, and confirm a reference time. In addition, the video editing UI control apparatus may extend the start point of the selected clip 717 to the play head 716.

Likewise, when confirming that a user input occurs in an area in which the end point extension UI 713E (S913), the video editing UI control apparatus may confirm a reference time and extend the end point of the selected clip 718 to the confirmed reference time on the play head 716.

The exemplary methods described herein were expressed by a series of operations for clear description, but it does not limit the order of performing the steps, and if necessary, the steps may be performed sin in different orders. In order to achieve the method of the present disclosure, other steps may be added to the exemplary steps, or the other steps except for some steps be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. A video editing UI control apparatus comprising:
    a display device configured for displaying an editing UI comprising a play head and a clip movement control UI, wherein the display device is further configured to display a video frame, the video frame corresponding to a reference time indicated by the play head at a position within the editing UI that corresponds to the reference time;
    a user input confirmation unit configured for confirming user input information based on a user input that is provided through a touch input in the display device; and
    an editing UI processing unit configured for confirming an input of the clip movement control UI based on the user input information provided by the user input confirmation unit and configured for moving a clip to automatically align a start point or an end point of the clip with the position within the editing UI that corresponds to the reference time;
    wherein the clip movement control UI comprises a clip extension UI that extends the clip to align the start point or the end point of the clip with the reference time automatically; and
    wherein the editing UI processing unit is configured to confirm the reference time and, in response to a selection of the clip extension UI, to extend the start point or the end point of the clip to the reference time.

2. The video editing UI control apparatus of claim 1, wherein the clip includes video.

3. The video editing UI control apparatus of claim 1, wherein the clip includes an image.

4. The video editing UI control apparatus of claim 1, wherein the clip includes audio.

5. The video editing UI control apparatus of claim 1, wherein the clip includes a voice signal.

6. A video editing UI control method comprising:
    displaying an editing UI comprising a play head and a clip movement control UI in a display device;
    displaying a video frame, the video frame corresponding to a reference time indicated by the play head at a position within the editing UI that corresponds to the reference time;
    confirming user input information based on a user input that is provided through a touch input in the display device; and
    confirming the user input information and an input of the clip movement control UI based on the user input information and moving a clip to automatically align a start point or an end point of the clip with the position within the editing UI that corresponds to the reference time;
    wherein the clip movement control UI comprises a clip extension UI that extends the clip to align the start point or the end point of the clip with the reference time automatically; and
    wherein the moving the start point or the end point of the clip comprises confirming the reference time and, in response to a selection of the clip extension UI, extending the start point or the end point of the clip to the reference time.

7. The video editing UI control method of claim 6, wherein the clip includes video.

8. The video editing UI control method of claim 6, wherein the clip includes an image.

9. The video editing UI control method of claim 6, wherein the clip includes audio.

10. The video editing UI control method of claim 6, wherein the clip includes a voice signal.

* * * * *